United States Patent Office 3,127,366
Patented Mar. 31, 1964

---

3,127,366
STABILIZED VINYL CHLORIDE-CONTAINING RESINS
Baruch Zaremsky, South Euclid, Ohio, assignor to Ferro Corporation, Cleveland, Ohio, a corporation of Ohio
No Drawing. Filed Oct. 26, 1959, Ser. No. 848,493
9 Claims. (Cl. 260—23)

This invention relates, as indicated, to stablized chlorine-containing resins, and has more particular reference to chlorine-containing resins having improved heat stability, and improved characteristics with respect to what is known in the trade as "plateout."

This application is a continuation-in-part of my copending application Serial No. 693,045, filed October 29, 1957, now abandoned.

The chlorine-containing vinyl resins with which the present invention is primarily concerned are characterized by chlorine in chemical combination with the resin molecule as distinguished from resins in which chlorine is introduced in the form of a separate chemical compound. In the usual instance, the monomer from which the vinyl resin is made by the various polymerization techniques known to the art, contains chlorine in chemical combination therewith such as in the case of vinyl chloride, and mixtures of this material or other polymerizable or copolymerizable monomers such as vinyl acetate, vinyl butyrate, vinylidene chloride, etc., e.g. vinyl chloride-vinyl acetate copolymer (87%–13%) and terpolymers e.g. vinyl chloride/vinyl acetate/maleic anhydride (86%–13%–1%). Those resins characterized by the presence of vinyl chloride contain from about 70% to 100% vinyl chloride are stabilized in accordance herewith. Copolymers with vinyl chloride and acrylonitrile are stabilized in accordance herewith.

Alternatively, however, the chlorine may be introduced into the resin following polymerization such that the resultant composition is a chlorine-containing vinyl resin in which the chlorine is chemically united with the resin molecule. Thus, resins such as chlorinated polyethylene, chlorinated polypropylene, chlorinated rubber, chloroprene, chlorinated polystyrene, etc. may also be conveniently stabilized in accordance with the teachings of this invention. Principal among the resins containing chemically bonded chlorine therein as a part of the resin itself are therefore, polyvinyl chloride, homopolymers, vinyl chloride-vinyl acetate copolymers and vinyl chloride-acrylonitrile copolymers.

When chlorine-containing resins of the aforesaid type are subjected to operations such as calendering, extrusion, molding, and related processes involving working of the resin, such plastic compositions, especially those which contain fillers and pigments, are subject to a serious problem known in the art as "plateout."

"Plateout" is the accumulation of a deposit on the working surfaces of the calender, extruder, or mold which surfaces come into intimate contact with the plastic composition being processed. This accumulation usually comprises a deposit of pigments, fillers, and other ingredients normally present in the resin. These deposits cause discoloration and marring of the surfaces of subsequent films, sheets or molded shapes being formed by the processing equipment. It becomes necessary at this point, then, to stop production and clean the equipment, a costly and time-consuming procedure.

It has also been found that materials regarded as desirable heat and light stabilizers tend to aggravate the problem of "plateout." Chief among the substances regarded as promoters of "plateout" are combinations of barium and cadmium salts of monocarboxylic acids of both the aliphatic and aromatic types. Thus, a combination of barium and cadmium salts which aggravates the problem of "plateout" is a 50–50 mixture of barium and cadmium laurates. This undesirable feature has limited the acceptability of such salts, despite the fact that they are excellent for conferring long term heat stability, and they are economically desirable to use.

Still another problem associated with the use of cadmium salt is the susceptibility of the plastic composition to sulphur stain, that is, the development of a yellow color characteristic of cadmium sulfide, when the resin composition is exposed to a reactive sulfur-containing gas such as hydrogen sulfide.

It is, therefore, a principal object of this invention to provide chlorine-containing vinyl resins which have substantially no "plateout," are resistant to sulfur stains, and also have long term heat stability.

Other objects of this invention will become apparent as the description proceeds.

To the accomplishment of the foregoing and related ends, the invention, then, comprises the features hereinafter fully described and particularly pointed out in the appended claims, the following description setting forth in detail certain illustrative embodiments of the invention, these being indicative, however, of but a few of the ways in which the principle of the invention may be employed.

It has been found that the cadmium salts of 9-hydroxy stearic acid, 10-hydroxy stearic acid, and 12-hydroxy stearic acid, or mixtures of cadmium salts of any two or all three of these acids are particularly effective in the stabilization of chlorine-containing vinyl resins, yielding products which are substantially free from the problem of "plateout," resistant to sulfur stain, and characterized by improved heat stability. Cadmium appears to be specific for these purposes, as the metal for forming the salt of the specific hydroxy stearic acids hereof. The location of the hydroxyl group in the stearic acid and the absence of unsaturated linkages are also critical. For example, cadmium ricinoleate, an example of an unsaturated fatty acid material, and cadmium alpha-hydroxy sterate do not appear able to confer upon chlorine-containing vinyl resins the improvements which seem to be typical of the cadmium salts of the 9-, 10-, and 12-hydroxy stearic acids. Other materials do not need to be present in the composition in addition to the vinyl resin and the particular cadmium hydroxy sterates hereof in order for the effect of that material on the stability of the resin in the above-mentioned particulars to be noted. In most cases, however, other additives, e.g. plasticizers, auxiliary stabilizers, pigments and extenders are included to confer such desired properties as is normally expected from such materials without, however, apparent deleterious effect on the principal additives hereof.

The cadmium 9-, 10-, and 12-hydroxy stearates offer excellent long term heat stability in combination with chlorine-containing vinyl resins in amounts ranging from 0.1 to 10 parts per 100 parts of resin on a weight basis. These cadmium hydroxy stearates may also be incorporated in combination with barium, calcium and strontium salts of monocarboxylic acids, either aliphatic or aromatic, to obtain even longer term heat stability. Thus, in a polyvinyl chloride homopolymer, from 0.1 to 10 parts per 100 parts of such resin of cadmium 12-hydroxy stearate may be used alone to secure long range heat stability, elimination of "plateout," and decreased sulphur stain. The composition may be improved with respect to wide range (short term and long term) heat stability by the further inclusion of an amount of barium stearate, calcium stearate, strontium laurate, calcium benzoate, or the like equivalent in amount by weight to the weight of the cadmium 12-hydroxy stearate to obtain even longer term heat stability. In addition, each of these three cadmium hydroxy stearates will be found to be very useful in combination with any of the other well known chlorine-containing vinyl resin stabilizers such as, the polyhydric alcohols, e.g. pentaerythritol, phenolates, epoxidized compounds, phosphites, and other metal salts or organic acids.

Various metal salts including the cadmium salt of ricinoleic acid, which is 12-hydroxy oleic acid, have been used in combination with chlorine-containing vinyl resins. It is to be noted, however, that the present invention contemplates only the use of cadmium 9-hydroxy stearate, cadmium 10-hydroxy stearate, and cadmium 12-hydroxy stearate, or mixtures thereof. These are saturated compounds. It has also been found that the cadmium salt of 12-hydroxy oleic acid which has a double bond at the 9-10 position, does not produce a cadmium salt which is comparable in effect to the present cadmium salts. Additionally, it has been found that cadmium ricinoleate intensifies sulfur staining.

The cadmium 9-, 10-, and 12-hydroxy stearates of this invention are incorporated in the chlorine-containing vinyl resin in amounts ranging from 0.01 part to 10 parts per 100 parts of resin. The mode of incorporating these stabilizers in the resins is that which is conventional for the incorporation of other stabilizers. When used in combination with the barium, calcium, or strontium salts of monocarboxylic acids, or when used in combination with other well known vinyl stabilizers such as enumerated above, the combined stabilizer should comprise at least 20% of one or more of the cadmium 9-, 10-, and 12-hydroxy stearates, and the total combined stabilizer should be used in the amount ranging from 0.01 to 10 parts per 100 parts of resin. Parts are on a weight basis.

The following tests which are representative of the class of chlorine-containing vinyl resins illustrate the efficacy of the stabilizers of the present invention.

"PLATEOUT" TEST

The "plateout" test is conducted in two parts. First, a standard red composition of the following formulation is milled for seven minutes at 300° F.:

| | Grams |
|---|---|
| Polyvinyl chloride resin | 100 |
| Dioctyl phthalate | 47 |
| Red dye [1] | 1 |
| Stabilizer | 2 |

[1] Watchung red is a typical useful red dye.

As the composition is being milled a sheet is formed which deposits a red film on the rolls of the mill. Second, the red sheet after the designated time is removed from the mill and then a cleanup sheet standardized at 152 grams of the following formulation is put through the mill for five minutes at 300° F.:

| | Grams |
|---|---|
| Polyvinyl chloride resin | 100 |
| Dioctyl phthalate | 47 |
| Stabilizer | 3 |
| Calcium silicate pigment | 2 |
| $TiO_2$ | 0.5 |

This second sheet which is white absorbs the red deposit left on the rolls by the first sheet. The intensity of the pinkness of the second sheet is the criterion of the test.

For the purposes of reporting results an arbitrary color scale of 0 to 5 is used. Zero is no "plateout" and 5 being a deep red indicating serious "plateout," ratings 1 through 4 are approximately proportional steps between 0 and 5 ratings.

SULFUR-STAINING TEST

Sample strips are cut from milled stock prepared the same as the white cleanup sheet and hung lengthwise on a horizontal rack supported by a pedestal. This unit is placed in a glass desiccator containing a layer of water at the bottom. Hydrogen sulfide gas is passed into the desiccator through a hose inserted in the rubber stopper and dipping under the surface of the water. The $H_2S$ is allowed to bubble through the water for a short time with the desiccator lid open so as to evacuate air. The lid is then closed and $H_2S$ is continued for one minute. The desiccator is then left closed for 30 minutes, after which time samples are inspected for discoloration.

The discoloration is measured from an off white-yellow at 1 to bright lemon yellow at 5.

HEAT STABILITY TEST

A standard formulation for this test is:

100 grams polyvinyl chloride resin
42 grams dioctyl phthalate
5 grams epoxidized soyabean oil plasticizer
25 grams calcium carbonate
5 grams titanium dioxide
2 grams of stabilizer This mixture is fused on a two-roll mill at 320° F. for 5 to 10 minutes. Samples from this sheet are placed in an oven at 365° F. and suspended from hooks at the perimeter of a wheel, horizontally mounted on a motor-driven shaft. It is important that the oven be as free as possible of local hot spots, that air circulation within the oven be uniform, and that the procedure for inserting and removing samples be standardized.

The heat stability is rated by the number of minutes at 365° F., in the oven, to lose whiteness.

*Example I*

Pursuant to the instructions given above for each of the tests, sheets were prepared by milling compositions as follows:

| | Grams |
|---|---|
| Polyvinyl chloride resin | 100 |
| Dioctyl phthalate | 47 |
| Cadmium stearate | 3 |
| Calcium silicate | 2 |
| $TiO_2$ | 0.5 |

The sheet prepared according to this formulation tested in accordance with the "plateout" test resulted in a sheet having a rating of 4. The sulfur stain test gave a rating of 5. The heat stability test showed a loss of whiteness in 30 minutes.

*Example II*

Sheets were prepared in accordance with the following formulation:

| | Grams |
|---|---|
| Polyvinyl chloride resin | 100 |
| Dioctyl phthalate | 47 |
| Cadmium 12-hydroxy stearate | 3 |
| Calcium silicate | 2 |
| $TiO_2$ | 0.5 |

This composition on the "plateout" test gave a rating of 1, and on the sulfur stain test resulted in a slight discoloration to a yellowish off-white for a rating of 2.

*Example III*

The following composition was tested according to the heat stability test given above:

| | Grams |
|---|---|
| Polyvinyl chloride resin | 100 |
| Dioctyl phthalate | 42 |
| Epoxidized soyabean oil | 5 |
| Calcium carbonate | 25 |
| Titanium dioxide | 5 |
| Cadmium 12-hydroxy stearate | 2 |

This composition when submitted to the heat stability test showed a loss of whiteness in 60 minutes.

Utilizing the same composition as given above in Example III, with the exception that in place of all of the cadmium 12-hydroxy stearate, there was used 2 grams of cadmium stearate, the heat stability test on this latter composition showed a loss of whiteness at 30 minutes.

Example IV

Sheets were prepared as described in the foregoing tests using a cadmium laurate-barium laurate mixture in a ratio of 2:1. These sheets had the following formulation:

| | Grams |
|---|---|
| Polyvinyl chloride resin | 100 |
| Dioctyl phthalate | 47 |
| Cadmium laurate | 2 |
| Barium laurate | 1 |
| Calcium silicate | 2 |
| $TiO_2$ | 0.5 |

On the "plateout" test, the white "plateout" sheet was very opaque, and the red "plateout" showed a rating of 4 to 5 on this sheet. In the sulfur stain test, the sheet displayed a bright lemon yellow color for a rating of 5.

Example V

A sheet was prepared according to the formulation as follows and submitted to the heat stability test:

| | Grams |
|---|---|
| Polyvinyl chloride resin | 100 |
| Dioctyl phthalate | 42 |
| Epoxidized soyabean oil | 5 |
| Calcium carbonate | 25 |
| Titanium dioxide | 5 |
| Cadmium laurate | 1.34 |
| Barium laurate | 0.67 |

The heat stability test on this composition showed a slight off-white at 30 minutes which increased to a cream color at 75 minutes.

Example VI

Sheets were prepared according to the following formulation utilizing a cadmium 12-hydroxy stearate-barium laurate mixture as the stabilizer in which the cadmium and barium compounds were in a 2:1 ratio.

| | Grams |
|---|---|
| Polyvinyl chloride resin | 100 |
| Dioctyl phthalate | 47 |
| Cadmium 12-hydroxy stearate | 2 |
| Barium laurate | 1 |
| Calcium silicate | 2 |
| $TiO_2$ | 0.5 |

These sheets when submitted to the "plateout" test showed a rating of 1, and on the sulfur stain tests showed a rating of 1–2.

Example VII

The composition was prepared according to the following formulation and submitted to a heat stability test:

| | Grams |
|---|---|
| Polyvinyl chloride resin | 100 |
| Dioctyl phthalate | 42 |
| Epoxidized soyabean oil | 5 |
| Calcium carbonate | 25 |
| Titanium dioxide | 5 |
| Cadmium 12-hydroxy stearate | 1.34 |
| Barium laurate | 0.67 |

In the heat stability test, this sample remained white through 60 minutes of heat with no appreciable darkening until 100 minutes of heat.

Example VIII

Sheets were prepared in accordance with the formulation set forth for the "plateout" and sulfur stain tests above utilizing a cadmium 9-hydroxy and a cadmium 10-hydroxy stearate mixture admixed with a barium 9-hydroxy stearate and a barium 10-hydroxy stearate admixture in the ratio of 2:1 as above. These sheets had the following formulation:

| | Grams |
|---|---|
| Polyvinyl chloride resin | 100 |
| Dioctyl phthalate | 47 |
| Cadmium 9-hydroxy stearate-cadmium 10-hydroxy stearate mixture (1:1) | 2 |
| Barium 9-hydroxy stearate-barium 10-hydroxy stearate (1:1) | 1 |
| Calcium silicate | 2 |
| $TiO_2$ | 0.5 |

The "plateout" test sheet showed a rating of 1. On the sulfur stain test, the sheet was rated at 2.

Example IX

The following formulation was submitted to the heat stability test:

| | Grams |
|---|---|
| Polyvinyl chloride resin | 100 |
| Dioctyl phthalate | 42 |
| Epoxidized soyabean oil | 5 |
| Calcium carbonate | 25 |
| Titanium dioxide | 5 |
| Mixed cadmium 9-hydroxy stearate and cadmium 10-hydroxy stearate (1:1) | 1.34 |
| Mixed barium 9-hydroxy stearate and barium 10 hydroxy stearate (1:1) | 0.67 |

The foregoing composition in the heat stability test remained white after 30 minutes.

Example X

Comparison is made between the effects of the 12-hydroxy stearate and the alpha hydroxy stearate in the following heat stability test. Formulations were made as follows:

- 100 grams polyvinyl chloride resin
- 36 grams dioctyl phthalate
- 5 grams epoxidized soyabean oil
- 25 grams calcium carbonate
- 5 grams titanium dioxide
- 2 grams cadmium 12-hydroxy stearate
- 2 grams of stabilizer In the comparative test, the stabilizer in each case contained 8% cadmium and 6% barium as the metal. In one case the metals were present as the 12-hydroxy stearates of cadmium and barium respectively, and in the other case the metals were present as the alpha-hydroxy stearate of cadmium and barium respectively. The balance of the stabilizers in each case consisted of pentaerythritol. The composition of the stabilizer, then, is 1.0 part cadmium hydroxy stearate (either 12-hydroxy or alpha-hydroxy), 0.64 part barium hydroxy stearate (either 12-hydroxy or alpha-hydroxy), 0.36 part pentaerythritol.

The ingredients for each of the stabilized resins were combined on a two-roll steam heated mill for 5 minutes at 320° F. The milled sheets were placed in a forced convection oven at 365° F. and samples periodically removed. The color of the samples removed is observed and provides an indication of the degree of heat stability. The test sheet using the cadmium 12-hydroxy stearate in combination with the barium 12-hydroxy stearate was white for a period of 90 minutes and was only very slightly off-white at 120 minutes. The test sheet utilizing the cadmium alpha-hydroxy stearate was tan in 45 minutes, brown in 90 minutes and dark brown at 120 minutes.

Example XI

Comparison was made between comparable examples exactly the same in formulation except for the stabilizer. The comparison was made between the 12-hydroxy stearate and the ricinoleate. The basic formulation was composed of 100 grams of polyvinyl chloride
36 grams of dioctyl phthalate
30 grams calcium carbonate
5 grams titanium dioxide
3 grams stabilizer The stabilizer in the test cases was composed of cadmium 12-hydroxy stearate 1.42 parts, barium 12-hydroxy stearate 0.96 part, pentaerythritol 0.62 part. In the alternative case, the stabilizer was composed of 1.3 parts cadmium ricinoleate, 0.83 part barium ricinoleate, 0.87 part pentaerythritol.

The test samples utilizing the respective stabilizers in the amount of 3 parts per 100 parts of resin were combined on a two roll steam heated mill and mixed thereon for five minutes at 323° F. Strips cut from the sheets thus formed were exposed to $H_2S$ for 30 minutes at room temperature. The test sheet formulated containing the cadmium 12-hydroxy stearate in the stabilizing portion of the formulation was almost white with a pale yellowish cast. The test sheet formulated to include the cadmium ricinoleate was appreciably darker yellow.

Stabilization as to "plateout," sulfur staining, and heat stability will also be noted in the following compositions:

*Example XII*

| | Parts |
|---|---|
| Polyvinyl chloride resin | 100 |
| Dicoctylphthalate | 80 |
| Epoxidized soya bean oil | 10 |
| Cadmium 12-hydroxy stearic acid | X |

The above ingredients were worked on a heated two roll mill until a fused plastic sheet was formed. Pieces were cut from the sheet and heated in an air oven at 350° F. and periodically examined for color formation.

The results at various values for X are tabulated:

| Minutes in oven | Parts per hundred of resin of Cd 12 hydroxy stearate | | | | |
|---|---|---|---|---|---|
| | 0 Control | 0.1 | 0.5 | 5.0 | 10.0 |
| 15 | Bright yellow. | Off white. | Water white. | Off white. | Off white. |
| 45 | Orange. | Yellow. | Off white. | do | Tan. |
| 150 | Deep Red. | Lt. Orange. | Yellow. | Lt. Tan. | Tan. |
| 210 | Black. | Black. | Deep Red. | Tan. | Brown. |

This table shows that at all concentrations the cadmium 12-hydroxy stearate improves the color stability over the control. It also indicates that the optimum concentration for this particular plastic formulation is around 0.5 part per hundred of resin. Although the higher concentrations do give better retention of color on long term heating, the initial color is somewhat modified by these high concentrations.

*Example XIII*

| | Parts |
|---|---|
| Vinyl chloride-vinyl acetate (87:13) | 100 |
| Dioctylphthalate | 40 |
| Cadmium salt of mixed 9-hydroxy and 10-hydroxy stearic acids | 3 |

The above formulation, along with a control containing no additive were treated as in Example XII with the oven at 330° F. At fifteen minutes in the oven, the control was dark brown while the above formulation was water white.

*Example XIV*

| | Parts |
|---|---|
| Vinyl chloride-vinyl acetate (87:13) | 100 |
| Dioctylphthalate | 30 |
| Epoxidized soya bean oil | 10 |
| Cadmium salt of mixed 9-hydroxy and 10-hydroxy stearic acids | 2 |

The above, compared with a control as in Example XIII, gave a water white color at 30 minutes in the oven while the control was bright lemon yellow.

The foregoing compositions are merely illustrative of compositions which may be made in accordance with the present invention. The presence in certain instances of other stabilizers in combination with the preferred stabilizers of the present invention is merely indicative of a preferred mode of formulating the composition. It is to be understood that compositions not containing other stabilizers, or free from pigments, dyes, fillers, extenders, and other commonly incorporated ingredients, are likewise effective in the achievement of the purposes of the present invention.

Other modes of applying the principle of the invention may be employed, change being made as regards to details described provided the features stated in any of the following claims or the equivalent of such be employed.

I, therefore, particularly point out and distinctly claim as my invention:

1. A composition of matter comprising a vinyl chloride containing resin and from 0.01 to 10 parts by weight per 100 parts of said resin of a stabilizer intimately admixed therewith, said stabilizer comprising cadmium 9-hydroxy stearate.

2. A composition of matter comprising a vinyl chloride containing resin and from 0.01 to 10 parts by weight per 100 parts of said resin of a stabilizer intimately admixed therewith, said stabilizer comprising cadmium 10-hydroxy stearate.

3. A composition comprising 100 parts by weight of a polyvinyl chloride resin and about 0.01 to 10 parts by weight of cadmium 9-hydroxy stearate.

4. A composition comprising 100 parts by weight of a polyvinyl chloride resin and about 0.01 to 10 parts by weight of cadmium 10-hydroxy stearate.

5. A composition comprising (1) 100 parts by weight of polyvinyl chloride, (2) about 2.5 to 35 parts by weight of a filler for said polyvinyl chloride, and (3) about 0.01 to 10 parts by weight of a mixture of a cadmium soap and a barium soap, at least 20% by weight of said mixture being a cadmium salt of an acid of the group consisting of 9-hydroxy stearic acid, 10-hydroxy stearic acid and 12-hydroxy stearic acid.

6. A composition comprising (1) 100 parts by weight of a polyvinyl chloride resin, (2) about 2.5 to 35 parts by weight of a filler for said resin, and (3) about 0.01 to 10 parts by weight of a mixture of cadmium 12-hydroxy stearate and a barium salt of a monocarboxylic fatty acid in which the mixture comprises at least about 20% by weight of cadmium 12-hydroxy stearate.

7. A composition comprising about 100 parts by weight of polyvinyl chloride, about 2.5 to 35 parts by weight of a filler, and about 0.1 to 10 parts by weight of a mixture of cadmium 12-hydroxy stearate and a barium salt of a monocarboxylic fatty acid, the weight ratio of said cadmium 12-hydroxy stearate to said barium salt being about 2/1 to 1.5/1.

8. A composition comprising (1) 100 parts by weight of polyvinyl chloride, (2) about 2.5 to 35 parts by weight of a filler for the polyvinyl chloride, and (3) about 0.1 to 10 parts by weight of a mixture of barium laurate and cadmium 12-hydroxy stearate in which at least about 20% by weight of said mixture is cadmium 12-hydroxy stearate.

9. A composition comprising about 100 parts by weight of polyvinyl chloride, about 2.5 to 35 parts by weight of a filler, and about 0.01 to 10 parts by weight of cadmium 12-hydroxy stearate and barium laurate, the weight ratio of cadmium 12-hydroxy stearate to barium laurate being about 2/1.

(References on following page)

References Cited in the file of this patent

UNITED STATES PATENTS

| | | |
|---|---|---|
| 2,794,791 | Patton et al. | June 4, 1957 |
| 2,868,745 | Canarios | Jan. 13, 1959 |
| 2,918,451 | Elliott | Dec. 22, 1959 |

FOREIGN PATENTS

| | | |
|---|---|---|
| 634,762 | Great Britain | Mar. 29, 1950 |

OTHER REFERENCES

Vennels: Article in Plastics Institute (London) Transactions, volume 21, No. 43, 1953, pages 18–30.

Lally et al.: Article in Modern Plastics, volume 27, issue December 1949, pages 111 to 116.